Figure 1:
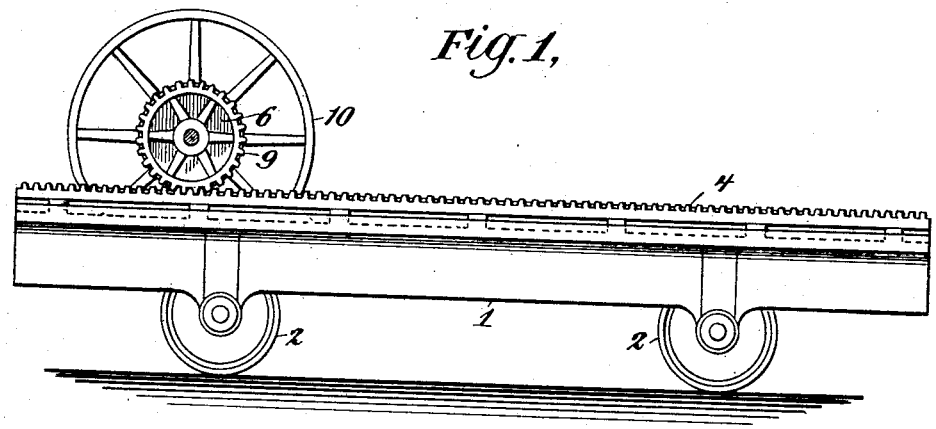

No. 710,434. Patented Oct. 7, 1902.
G. K. CUMMINGS.
PRISMATIC GLASS WINDOW.
(Application filed Aug. 15, 1898.)
(No Model.) 3 Sheets—Sheet 1.

WITNESSES:
Geo W. Fields Jr.
Sidney Mann

INVENTOR
George K. Cummings
BY
Walter & Kenyon
ATTORNEYS

No. 710,434. Patented Oct. 7, 1902.
G. K. CUMMINGS.
PRISMATIC GLASS WINDOW.
(Application filed Aug. 15, 1898.)

(No Model.) 3 Sheets—Sheet 2.

No. 710,434. Patented Oct. 7, 1902.
G. K. CUMMINGS.
PRISMATIC GLASS WINDOW.
(Application filed Aug. 15, 1898.)
(No Model.) 3 Sheets—Sheet 3.
Fig. 7.
Fig. 6.
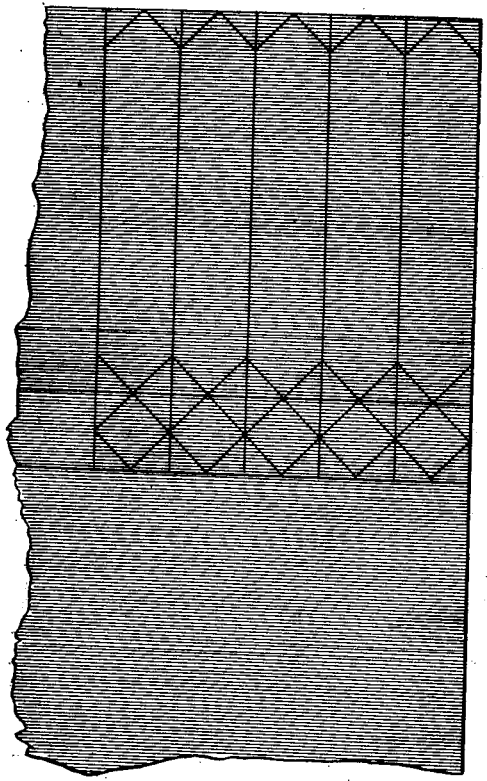
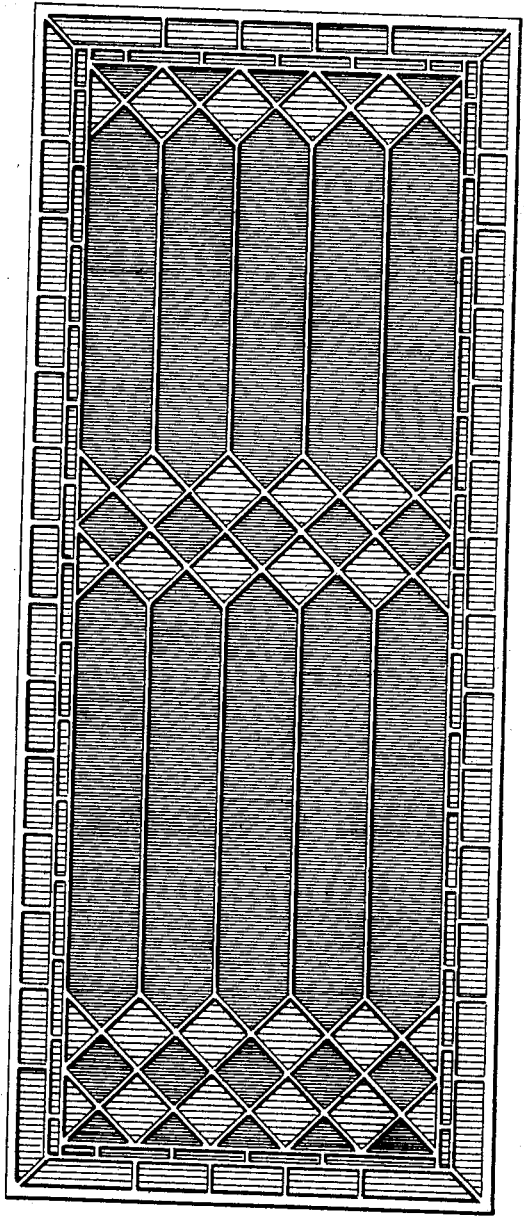
Fig. 8. Fig. 9.
 
WITNESSES:
INVENTOR
George K. Cummings
BY
Witter & Kenyon
ATTORNEYS

UNITED STATES PATENT OFFICE.

GEORGE K. CUMMINGS, OF CENTER RUTLAND, VERMONT.

PRISMATIC-GLASS WINDOW.

SPECIFICATION forming part of Letters Patent No. 710,434, dated October 7, 1902.

Application filed August 15, 1898. Serial No. 688,573. (No model.)

*To all whom it may concern:*

Be it known that I, GEORGE K. CUMMINGS, a citizen of the United States, residing in Center Rutland, county of Rutland, and State of Vermont, have invented a new and useful Improvement in Prismatic-Glass Windows, of which the following is a full, clear, and exact specification, reference being had to the accompanying drawings, which form a part hereof.

My invention relates to ornamental prismatic-glass windows made from panes of glass which are provided with a series of prismatic projections on their surface.

The object of my invention is to provide a prismatic-glass window which can be made by a simple and economical method of manufacture and which can be made in any design or pattern that may be desired.

Another object of the invention is to provide a prismatic-glass window which is capable of being produced in a great variety of designs without necessitating great expenditure of money in making new molds and without requiring that the manufacturer should carry a very large stock of prism-lights of different forms and shapes.

Another object of the invention is to provide prismatic-glass windows which can be made easily and quickly and without the aid of operators of a high degree of skill.

Another object of the invention is to produce an ornamental prismatic-glass window of a highly artistic character and of superior design and finish.

My invention consists first in a window made of prismatic glass, consisting of one or more panes of rolled glass having rolled prismatic projections upon its surface and having the property that it may be cut to size or shape desired, these panes being cut into the desired shapes and mounted in any suitable manner.

My invention consists also in a window made of prismatic glass, consisting of a number of panes of rolled glass having rolled prismatic projections upon its surface and having the property that it may be cut to size or shape desired and cut into the desired shapes, with the prismatic projections having the desired relative position and direction, the panes being assembled and glazed together in any suitable manner.

In the best form of my invention the panes of rolled prismatic glass are provided with parallel prismatic projections upon their surface.

Another feature of my invention consists in employing panes of rolled prismatic glass so cut that in the completed window the prismatic projections on all the panes are parallel with one another.

My invention also consists in certain other features hereinafter described and claimed.

Figure 2:
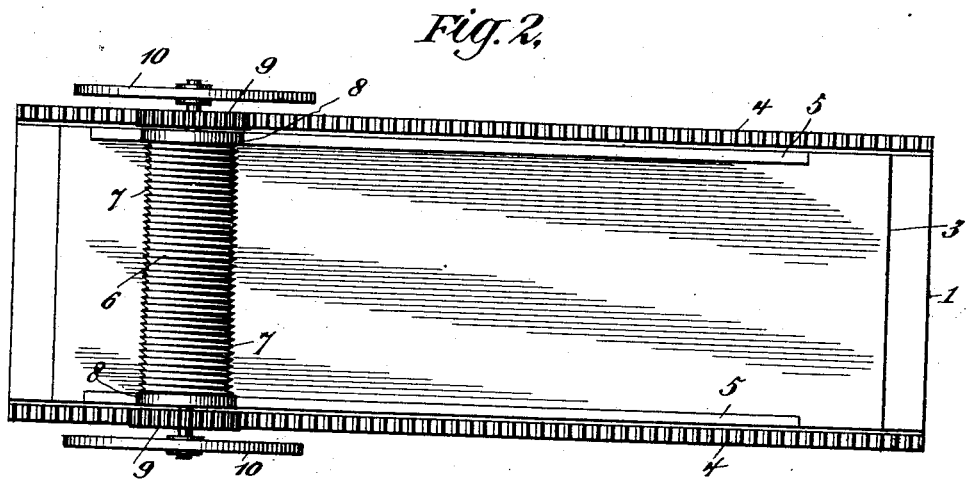
Figure 3:
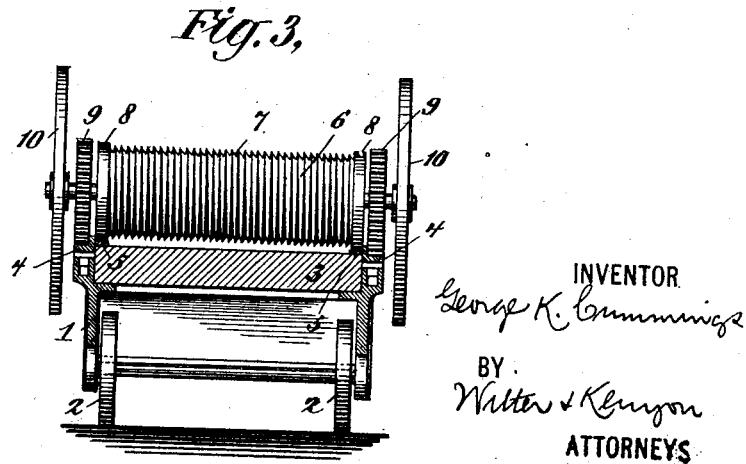
Figure 4:
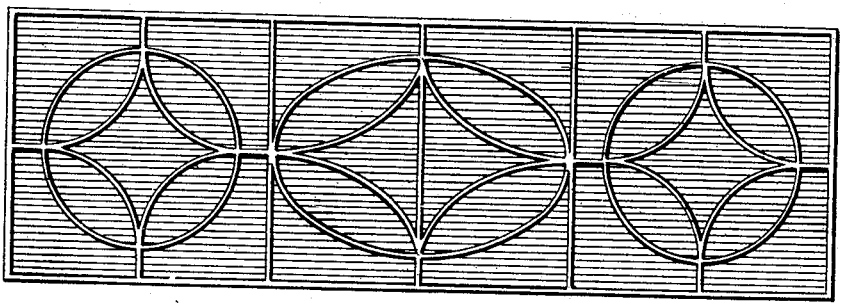
Figure 5:
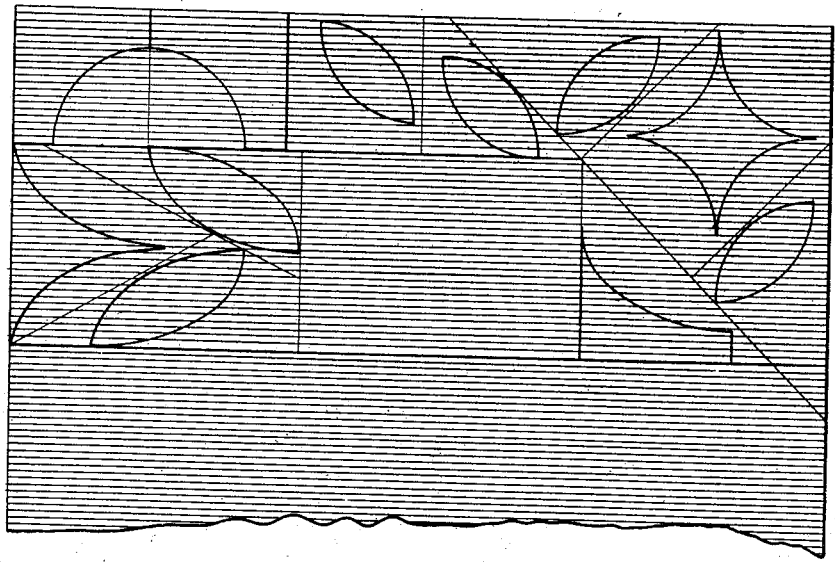

In Figures 1, 2, and 3 of the accompanying drawings I have shown an apparatus by means of which the sheets of rolled prismatic glass can be made from which the panes of prismatic glass are cut which are assembled and glazed to form my improved window. Fig. 1 is a side elevation of the machine. Fig. 2 is a plan view of the same, and Fig. 3 is a cross-sectional view thereof. Figs. 4 to 9 illustrate the method of cutting the panes of prismatic glass from the large sheets of rolled glass and of assembling them together to form the finished window. Fig. 4 represents a finished window made according to my invention and designed for use as a transom or some similar purpose. Fig. 5 shows a sheet of rolled prismatic glass having applied thereto patterns of some of the separate panes required to form the window shown in Fig. 4. Fig. 6 shows another design of window made according to my invention in which certain of the panes are provided with small prismatic projections on their surface, while the rest of the panes are provided with larger prismatic projections on their surface. Fig. 7 shows a portion of a sheet of prismatic glass having the smaller prismatic projections on its surface and having applied to its surface patterns of some of the panes of the finished window shown in Fig. 6, which are provided with the smaller prismatic projections. Fig. 8 is a cross-section of a portion of a sheet of glass having the larger prismatic projections on its surface, and Fig. 9 is a similar section of a portion of a sheet of glass provided with the smaller prismatic projections.

My improved prismatic-glass windows are made in the following manner: The glass is first melted by any suitable means until it is of the proper consistency. It is then stirred just before it is rolled, so as to make the mass homogeneous in temperature. It is then rolled in any suitable manner into a sheet having on its surface prismatic projections of the desired outline and arrangement. In the best form of my invention the prismatic projections on the sheet of rolled glass are parallel with one another. Any suitable mechanism or machine may be employed for rolling the glass. One form of apparatus suitable for this purpose is shown in Figs. 1 to 3, inclusive. 1 is a suitable framework, which is preferably mounted upon wheels 2, so that the machine can be conveniently moved from place to place. This framework carries the table 3, upon which the molten glass is poured and which serves to support the glass against the roller during the rolling operation. The table is provided with the racks 4 on the sides thereof. 5 5 are strips for regulating the thickness of the plate of prismatic glass which is produced by the machine. The surface of the table is plane. 6 is a roller provided with the continuous annular parallel ribs 7, which extend entirely around the roller. The plane of the ribs is parallel with the direction of motion of the roller and perpendicular to the plane of the glass plate to be formed. These ribs 7 are made to correspond in form with the depressions which it is desired to produce upon the upper side of the plate of glass. The roller is provided with a smooth bearing-surface 8 at its ends, adapted to rest and ride upon the strips 5. 9 9 are gears which are attached to the ends of the roller 6 and which are adapted to mesh with the racks 4. 10 10 are hand-wheels mounted on the ends of the roller, by means of which the roller is revolved and moved over the table 3. In using this apparatus the roller and the table are first heated, so as to be brought to the proper temperature for operating upon the glass. One way of doing this is by pouring some of the molten glass preliminarily upon the roller or table until they are properly heated. The roller is moved to one end of the table, and the molten glass is poured on the table in front of the roller, a sufficient quantity being supplied to the table to make a full sheet of prismatic glass. In order to make the mass of glass as nearly homogeneous as possible in temperature, it is then thoroughly stirred just before it is rolled. This can be done by any suitable means. The roller 6 is then rolled along the table, so as to roll the glass into the form of a sheet having rolled prismatic projections of the desired outline on its surface. These prismatic projections will be parallel with one another. The sheet of glass is then removed from the table and annealed. Any suitable form of leer or annealing-oven can be used for this purpose. It is important that the glass should be slowly and thoroughly annealed, because the sheet is irregular in cross-section and is therefore likely to break unless annealed with the greatest care. When the sheet of glass has been thus properly annealed and cooled, it is cut up into panes of the desired or necessary outline to form the completed window and in such a manner that the prismatic projections will have the desired relative position and direction. This can be done by any suitable means. I prefer to proceed as follows: The finished window is to be made up of a certain number of panes of prismatic glass. These panes may all be of the same shape and outline; but in most cases they vary in shape, and it is frequently the case that a single window contains a large number of differently-shaped panes. A pattern of any suitable material is made for each pane that is to be used in forming the window. These patterns are applied to the back or plane surface of the sheet of glass in the proper position relatively to the prismatic projections and to the position and arrangement which the panes are to have in the completed window, and the separate panes are cut out in accordance therewith by means of a diamond or other suitable instrument. The separate panes are then combined or assembled in accordance with the design for the completed window, and they are fastened and held in place by any suitable form of glazing or framework. Ordinarily metallic bars are employed for the glazing of the panes, these bars being so shaped as to fit the panes and having grooves into which the edges of the panes project. This method of glazing is well known.

In the best form of my invention the panes are cut out of the sheet of glass in such a manner that when the panes are assembled and combined in the complete window the prismatic projections of all the panes will be parallel with one another. As a result of this every part or pane of the window will tend to throw the rays of light passing through it in the same or a parallel direction, which will result in making the entire window appear bright and luminous when looked at from that direction.

In Figs. 4 and 5 I have shown one form of prismatic window embodying my invention and have illustrated the best method of making the same. Fig. 4 represents the finished window. The design of the window having been first prepared as shown in this figure, a pattern is made for each of its component panes or one for each different shape of pane. These patterns are then applied to a sheet of rolled prismatic glass, as partly illustrated in Fig. 5, and the separate panes are cut out in accordance therewith and so as to leave as small an amount of waste glass as possible. These panes are then assembled and glazed together, as shown in Fig. 4. It will be seen that the patterns in Fig. 5 are so applied to the glass plate that when the panes are cut out and properly combined and assembled the prismatic projections on the panes are all parallel.

In Figs. 6 to 9 I have shown another form of prismatic window embodying my invention and have illustrated the best way of making the same. Fig. 6 represents the finished window. Some of the panes of this window have small prismatic projections and the others have larger prismatic projections, as clearly shown in the drawings. Fig. 7 represents a sheet of prismatic glass from which the panes having the smaller projections are cut. Fig. 9 is a partial cross-sectional view of this form of glass. Fig. 8 is a similar cross-sectional view of the sheet of glass having larger projections. The patterns of the different panes are prepared as already explained and applied to the two sheets of glass, respectively, and the panes are thus cut out. They are then assembled and glazed, so as to form the window shown in Fig. 6.

By providing some of the panes with smaller prisms and other panes with larger prisms new and beautiful effects can be produced.

Many advantages result from this invention, some of which are as follows: Prismatic-glass windows can be made of a practically endless variety of designs without it being necessary for the manufacturer or the maker to constantly carry on hand a large stock of prismatic lights. Where windows are made from molded panes or lights, it would be necessary for the manufacturer to maintain an immense stock of these molded plates in order to be ready to make windows in accordance with any particular design that may be ordered. Ordinarily no two windows are of the same pattern or design; but each new case requires prismatic lights or panes of special sizes or forms. Even different sizes of the same design of window would have to be made up from a different stock of goods. No manufacturer can afford to separately mold the few lights or panes that are required for each new window. The cost of a window made in this way would be prohibitive. The result has been that heretofore in the practical art the number and variety of designs that have been made or that it has been possible to make from molded plates have been very limited. By employing my invention it is possible to produce a window in any design and having any number or variety of prism-panes and to do so quickly and economically. After a sheet of glass has been rolled it can be cut up into panes of any shape or outline desired, it being practically as easy and economical to produce one shape as another. It follows also that the variety of designs that can be economically and readily produced by employing my invention is practically without any limit. The prismatic glass is very easily and economically manufactured in the large sheets, and the preparation of the patterns and the cutting of glass can be done quickly and economically.

The prismatic-glass windows made according to my invention are superior in many respects. The panes of prismatic glass are perfect in outline and form and are not liable to have the imperfections which are found in molded prism-lights. The prisms are regular and uniform and perfect in shape. The outline of each pane of prismatic glass can be regulated with accuracy. The beauty and artistic merit of the window are far superior to anything heretofore produced.

I do not herein claim the machine for rolling sheets of prismatic glass which is shown and described herein, as I have claimed the said machine in a separate application, Serial No. 681,011, filed by me on May 18, 1898. I do not herein claim the improved method of making ornamental windows of prismatic glass herein shown and described, as I have claimed the said method in a separate application, Serial No. 84,207, filed by me November 30, 1901, as a division of this present application.

What I claim as new, and desire to secure by Letters Patent, is—

1. A prismatic-glass window comprising a sheet of rolled glass having rolled prismatic projections upon its surface, and having the property that it may be cut to size or shape desired.

2. A prismatic-glass window comprising a sheet of thin rolled glass having rolled prismatic projections upon its surface, and having the property that it may be cut to size or shape desired.

3. A prismatic-glass window consisting of a number of panes of rolled glass having rolled prismatic projections upon its surface, and having the property that it may be cut to size or shape desired, the panes being assembled and glazed together, substantially as set forth.

4. A prismatic-glass window consisting of a number of panes of thin rolled glass having rolled prismatic projections upon its surface, and having the property that it may be cut to size or shape desired, the panes being assembled and glazed together, substantially as set forth.

5. A prismatic-glass window, consisting of a number of panes of rolled glass having rolled prismatic projections upon its surface, and having the property that it may be cut to size or shape desired, the panes being assembled and glazed together, the different panes being so cut and arranged that the prismatic projections of the several panes have a predetermined position and direction with reference to one another, substantially as set forth.

6. A prismatic-glass window consisting of a number of panes of rolled glass, each pane having parallel rolled prismatic projections upon its surface, and having the property that it may be cut to size or shape desired, the panes being assembled and glazed together, and being so cut and arranged that the prismatic projections of the several panes have a predetermined position and direction with reference to one another, substantially as set forth.

7. A prismatic-glass window consisting of a number of panes of rolled glass, each pane having parallel rolled prismatic projections upon its surface, and having the property that it may be cut to size or shape desired, the panes being assembled and glazed together and the prismatic projections of all the panes being parallel.

8. A prismatic-glass window comprising thin-rolled annealed glass having rolled prismatic projections on its surface and having the property that it may be cut to size or shape desired.

9. A prismatic-glass window consisting of a number of panes of thin-rolled annealed glass having rolled prismatic projections upon its surface and having the property that it may be cut to size or shape desired, the panes being assembled and glazed together substantially as set forth.

10. A prismatic-glass window consisting of a number of panes of rolled annealed glass having rolled prismatic projections upon its surface, and having the property that it may be cut to size or shape desired, the panes being assembled and glazed together, and the different panes being so cut and arranged that the prismatic projections of the several panes have a predetermined position and direction with reference to one another, substantially as set forth.

In testimony whereof I have signed my name to this specification in the presence of two subscribing witnesses.

GEORGE K. CUMMINGS.

Witnesses:
EDWIN SEGER,
SIDNEY MANN.